(12) United States Patent
Ulrich

(10) Patent No.: US 7,920,063 B2
(45) Date of Patent: Apr. 5, 2011

(54) RFID THEFT PREVENTION SYSTEM

(75) Inventor: Richard Ulrich, Bentonville, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 626 days.

(21) Appl. No.: 11/837,818

(22) Filed: Aug. 13, 2007

(65) Prior Publication Data

US 2009/0045955 A1 Feb. 19, 2009

(51) Int. Cl.
*G08B 13/14* (2006.01)
*G08B 29/00* (2006.01)
*G08C 19/00* (2006.01)
*H04B 1/00* (2006.01)
*H04Q 1/00* (2006.01)
*G06F 19/00* (2006.01)
*G06Q 30/00* (2006.01)
*G06Q 20/00* (2006.01)

(52) U.S. Cl. ........... 340/572.1; 340/568.1; 340/5.92; 235/385; 705/23

(58) Field of Classification Search .... 340/568.1–572.9, 340/5.92, 825.49, 10.1–10.42; 235/375–385; 700/215–229; 705/22–23, 28–29, 17–18, 705/41

See application file for complete search history.

(56) References Cited

U.S. PATENT DOCUMENTS

| | | | | |
|---|---|---|---|---|
| 5,745,036 | A * | 4/1998 | Clare | 340/572.1 |
| 6,598,790 | B1 * | 7/2003 | Horst | 235/383 |
| 7,108,183 | B1 | 9/2006 | Cox, Jr. | |
| 7,123,146 | B1 * | 10/2006 | Holzman | 340/568.1 |
| 7,277,889 | B2 * | 10/2007 | Addonisio et al. | 707/10 |
| 2001/0000019 | A1 * | 3/2001 | Bowers et al. | 340/572.1 |
| 2002/0104013 | A1 * | 8/2002 | Ghazarian | 713/200 |
| 2002/0116274 | A1 * | 8/2002 | Hind et al. | 705/23 |
| 2003/0220711 | A1 * | 11/2003 | Allen | 700/215 |
| 2004/0143505 | A1 * | 7/2004 | Kovach | 705/23 |
| 2006/0004635 | A1 * | 1/2006 | Siefke et al. | 705/22 |
| 2006/0074759 | A1 * | 4/2006 | Claudatos et al. | 705/22 |
| 2006/0231611 | A1 * | 10/2006 | Chakiris et al. | 235/380 |
| 2007/0073513 | A1 * | 3/2007 | Posamentier | 702/150 |
| 2007/0205896 | A1 * | 9/2007 | Beber et al. | 340/572.1 |
| 2007/0229259 | A1 * | 10/2007 | Irmscher et al. | 340/568.2 |
| 2007/0279214 | A1 * | 12/2007 | Buehler | 340/521 |
| 2008/0211671 | A1 * | 9/2008 | Daily | 340/572.1 |
| 2008/0309491 | A1 * | 12/2008 | Gillard et al. | 340/572.1 |

* cited by examiner

*Primary Examiner* — Benjamin C Lee
*Assistant Examiner* — Michael Shannon
(74) *Attorney, Agent, or Firm* — Kenyon & Kenyon LLP

(57) ABSTRACT

Systems, apparatuses and methods for deterring product theft and preventing the fraudulent return or exchange of products. Products are associated with a Radio-Frequency Identification (RFID) tag. Tag readers located at store access points can detect the presence of the RFID tag and can be used to help determine a direction of travel of the RFID tag. When a product is determined to be leaving the store, the transaction history of the product can be accessed, as well as the supply chain history of the product, to confirm the product has been validly purchased and therefore authorized for removal from the store. When a product is determined to be entering a store, the supply chain history and transaction history of the product can be consulted to determine if the product can be validly exchanged or returned.

21 Claims, 2 Drawing Sheets

200

RFID THEFT PREVENTION SYSTEM

BACKGROUND OF THE INVENTION

1. Field of the Invention

The present invention generally relates to Radio-Frequency Identification (RFID) systems. More specifically, the present invention deters product theft by verifying the valid purchase of a product as the product is removed from a store.

2. Background Art

Product theft and the fraudulent return or exchange of merchandise costs retailers billions of dollars a year in losses. The costs associated with such nefarious activity are often passed along to manufacturers and customers. Accordingly, theft preventions systems are used by retailers to reduce instances of product theft and fraudulent product return or exchange.

To deter theft, retailers often staff one or more employees at the exits of a store. Other techniques for discouraging product theft include placing guards in a store or using video surveillance systems. Each of these mechanisms are expensive to implement, require significant oversight on the part of the retailer and are somewhat limited in their actual capacity to deter theft.

As an alternative to these solutions, conventional Electronic Article Surveillance (EAS) technology may be used by a retailer. With EAS, an electronic tag is placed on a product. The tag is removed or deactivated at the point of sale of the product. If the tag is not removed or deactivated, then the tag can trigger an alarm when it passes through an exit of a store. The effectiveness of EAS systems, however, can be severely limited by tag tampering. Further, the frequency of false alarms (i.e., triggering an unnecessary alarm) may limit the effectiveness of EAS systems as store employees can become indifferent to alarm signals that become commonplace. EAS systems are also not able to verify whether a product has been validly purchased when the product is removed form a store. Further, EAS systems are unable to provide any means for determining when a product enters a store or for determining if the return or exchange of the product is authorized.

Accordingly, what is needed is a more robust theft prevention system to prevent both product theft and the fraudulent return or exchange of merchandise. In particular, the theft prevention system should be capable of verifying the valid purchase of a product when the product leaves a store. Further, the system should be capable of determining when a product enters a store and whether or not the return or exchange of the product is acceptable by associating the product with the supply chain history of the product.

BRIEF DESCRIPTION OF THE DRAWINGS

The accompanying drawings illustrate the present invention and, together with the description, further serve to explain the principles of the invention and to enable one skilled in the pertinent art to make and use the invention.

DETAILED DESCRIPTION OF THE INVENTION

Embodiments of the present invention provide systems, apparatuses and methods for deterring product theft and preventing the fraudulent return or exchange of merchandise. Products can be associated with a Radio-Frequency Identification (RFID) tag. RFID tag readers located near the access points of a store can detect the presence of the RFID tag using interrogation signals. Response signals from the RFID tag can be used to determine whether the product is entering or exiting the store. When a product is determined to be leaving the store, aspects of the present invention allow the transaction history of the product to be accessed, as well as the supply chain history of the product, to confirm the product was validly purchased and therefore authorized to exit the store. When a product is determined to be entering a store, aspects of the present invention enable the supply chain history and transaction history of the product to be consulted to determine if the product can be validly exchanged or returned.

System Overview

Figure 1:
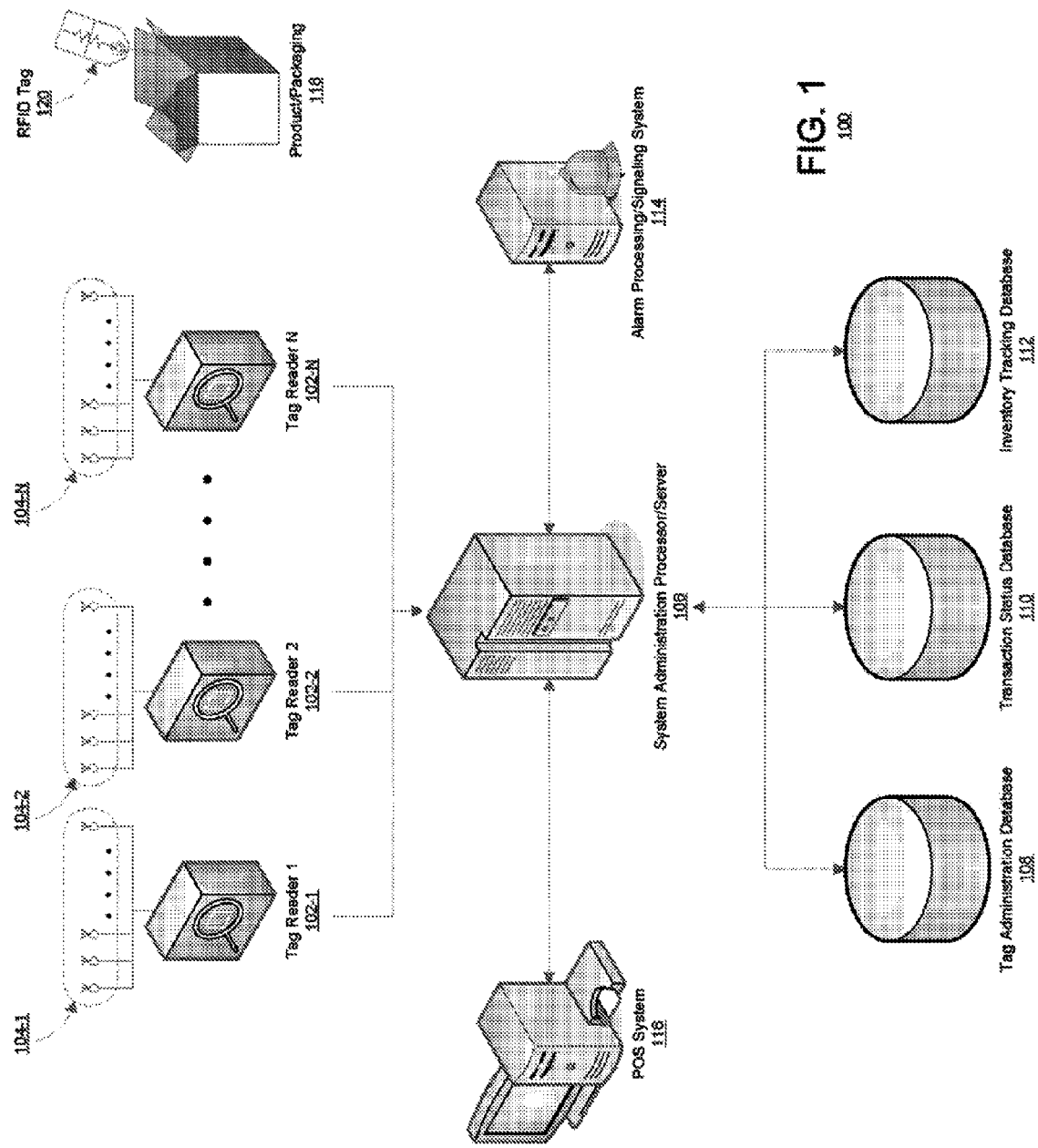
FIG. 1 illustrates a theft prevention system in accordance with an aspect of the present invention.

FIG. 1 illustrates a theft prevention system 100 in accordance with an aspect of the present invention. The theft prevention system 100 comprises a number of RFID tag readers or sensors 102-1 through 102-N, a system administration processor/server 106, an RFID tag administration database 108, a product transaction status database 110, an inventory tracking database 112, an alarm processing/signaling system 114 and a Point of Sale (POS) system/processor 116. The theft prevention system 100 can operate to prevent or deter the theft of product/packaging 118 having RFID tag 120. The theft prevention system 100 can also operate to prevent the fraudulent return or exchange of the product 118. The theft prevention system 100 can be deployed to operate within a place of business which presents products or merchandise for purchase by a consumer (e.g., a supermarket, electronics store, etc.) or any other store, retail outfit or building storing products or merchandise (e.g., a warehouse).

The theft prevention system 100 can include a single tag reader 102-1 or can include multiple tag readers 102-1 through 102-N. The tag readers 102-1 through 102-N can each respectively include corresponding antenna arrays 104-1 through 104-N. Each antenna array 104 can comprise a single antenna or multiple antennas. The tag readers 102-1 through 102-N can be located in close proximity to the access points (i.e., the entrances and exits) of the building or store in which the theft prevention system 100 is deployed. The tag readers 102-1 through 102-N can be allocated to accommodate multiple access points as store buildings often include several doorways or separated entrance and exit access points. Further, the tag readers 102-1 through 102-N can be distributed on both sides of an access point. That is, for each access point, a first portion of the tag readers 102-1 through 102-N can be distributed on a first side of a given access point (e.g., on the outside of the store building or in a foyer or entranceway) while a second portion of the tag readers 102-1 through 102-N can be distributed on a second side of the access point (e.g., on the inside of the store building where products are stocked or otherwise presented for display). The tag readers 102-1 through 102-N can also be located in or used in conjunction with physical barriers or stands positioned on either side of a doorway to restrict travel around the doorway. Such barriers or stands can be positioned to funnel traffic to the doorway such that a person must walk between a pair of barriers to pass through an access point of a store.

The tag readers 102-1 through 102-N each transmit or broadcast interrogation signals. The interrogation signals can be continuously or periodically transmitted. The broadcasted interrogation signals can prompt an RFID tag to transmit a response signal if the RFID tag is within range to receive one of the interrogation signals. Typically, an RFID tag will transmit a single response signal for each received interrogation signal. The interrogation response signals received by the tag readers 102-1 through 102-N can be used to determine a direction of travel or a direction of movement of an RFID tag. Accordingly, it can be determined whether a responding RFID tag is entering the store building or is exiting the store building at a particular access point.

Advanced signal processing techniques can be used to process one or more of the received response signals. For example, one or more or any combination of techniques exploiting temporal diversity, spatial diversity and signal strength measurement processing can be used to process the received response signals. The signal processing techniques can also use information provided by one or more motion sensors (not depicted in FIG. 1) located within the store building to aid in the determination of the direction of travel of an RFID tag. The motion sensors can be distributed near access points or can be located throughout a store to help determine a pattern of movement.

As shown in FIG. 1, the tag readers 102-1 through 102-N can be connected to the system administration server 106. Response signals received by any of the tag readers 102-1 through 102-N can be forwarded to the system administration system 106 for processing. That is, the system administration server 106 can implement the signal processing techniques necessary to determine the direction of travel of the RFID tag transmitting the response signals received by the tag readers 102-1 through 102-N. The tag readers 102-1 through 102-N can communicate with the system administration server 106 over a variety of communication mediums using a variety of communication protocols. Accordingly, the communication medium and the communication protocol connecting the tag readers 102-1 through 102-N to the system administration server 106 are immaterial to the present invention unless explicitly stated otherwise.

The system administration server 106 can be located on-site or off-site with respect to the location of the tag readers 102-1 through 102-N. That is, the system administration server 106 can be located on the same premises as the building operating the theft prevention system 100 or can operate at a location remote from such a building or store. As previously mentioned, the system administration server 106 can receive forwarded interrogation response signals from the tag readers 102-1 through 102-N. Further, the system administration server 106 can implement one or more signal processing techniques based on the received response signals to determine the direction of the RFID tag transmitting the response signals. As shown in FIG. 1, the system administration server 106 can be connected to the POS system 116, the RFID tag administration database 108, the product transaction status database 110, the inventory tracking database 112 and the alarm processing/signaling system 114. The communication mediums and the communication protocols connecting the system administration server 106 to each of these other components of the theft prevention system 100 are immaterial to the present invention unless explicitly stated otherwise.

The RFID tag administration database 108 can be used to store information or records relating to products that are RFID secured. That is, the RFID tag administration database 108 can store records identifying which products or types of products include RFID theft prevention tags. The RFID tag administration database 108 can store records for product types in general (e.g., records indicating that the Sony PSP® products stocked by a store are RFID secured) and/or can store records for each individual product or individualized instance of a product type (e.g., records indicating exactly which Sony PSP® products stocked by a store are RFID secured).

At the more generic product type level (e.g., Stock Keeping Unit—SKU—level), the RFID tag administration database 108 can store information relating to product manufacturer and product line. For example, the RFID tag administration database 108 can store Universal Product Code (UPC) information for each product line with a corresponding entry indicating if a particular product line will be or is RFID secured.

At the more detailed specific product level, the RFID tag administration database 108 can store information which allows each individualized product to be specifically identified as being RFID secured. For example, the RFID tag administration database 108 can store a unique product identification code for each product that is stocked in a particular store and is RFID secured. To do so, the RFID tag administration database 108 can store an Electronic Product Code (EPC) code, a UPC code and a serial number of the EPC code, and/or a barcode associated with a specific product. The RFID tag administration database 108 can be accessed by the system administration server 106 to determine if a particular product (e.g., a product associated with an RFID tag transmitting interrogation response signals to the tag readers 102-1 through 102-N) is an RFID secured product.

The transaction status database 110 can store information or records related to the transaction or purchase status of individualized products. The transaction status database 110 can pre-store information related to individualized products and can update or modify such records when a transaction occurs. Alternatively, the transaction status database 110 can create a record related to an individualized product when a first transaction occurs or when a change in transaction status occurs. To identify specific products, the transaction status database 110 can store a unique product identification code such as, for example, one or more of a product's EPC code, a UPC code and a serial number of the EPC code, a barcode or any combination thereof.

Records for individualized products can be modified or supplemented as the transaction status of a product changes. For example, the transaction status database 110 can be modified to indicate that a specific product has been "purchased" when the product has been properly acquired by a customer. Similarly, the transaction status database 110 can be modified to indicate that a specific product has been "returned/restocked" when the product has been properly returned by a customer and will be re-stocked/re-shelved to offer the product for sale again. The transaction status database 110 can be accessed by the system administration server 106 to determine the transaction status of a product having an RFID tag that is determined to be entering or exiting an access point of a store.

The inventory tracking database 112 can store information or records related to the movement or whereabouts of a specific product within the supply chain of a store or company. This is known in the retail industry as the pedigree of a product. The supply chain of a store can include the supply chain of related or sister stores that may be owned or operated by the same company or related companies. Accordingly, the supply chain of a store may not be so limited as to only include routes or intermediate destinations applicable to a certain store only but can include the entire supply chain for a retailer.

For each specific product sold or stocked by a store, the inventory tracking database 112 can maintain records indicating, for example, when and where the specific product entered the supply chain of the store/company, the intermediate destinations of the specific product prior to arrival at a specific store location, the time spent in transit or at each location in the supply chain, etc. The inventory tracking database 112 can maintain records organized by store, by product, and/or by geographical region/zone. The inventory tracking database 112 can be accessed by the system administration server 106 to determine the inventory history of a specific product. Specifically, the system administration server 106 can use the information stored in the inventory tracking database 112 to determine if a product was ever stocked at a particular store (e.g., any store owned and operated by a retailer) and/or if the product was stocked at the store operating the theft prevention system 100.

The databases 108, 110 and 112 are depicted in FIG. 1 to be separate databases for clarity and is not intended to limit the structure, arrangement or location of the records or information maintained by each of the databases 108, 110 and 112. The databases 108, 110 and 112 can be operated together as one or more databases. Further, the databases can be located at the same location as a store operating the theft prevention system 100 or can be located off-site. The databases 108, 110 and 112 can be implemented using a variety of database access/maintenance technologies. The communication mediums and the communication protocols connecting the databases 108, 110 and 112 to the other components of the theft prevention system 100 are immaterial to the present invention unless explicitly stated otherwise.

The POS system 116 can be used to facilitate the purchase of a specific product by a customer. The POS system 116 is typically located at a product checkout station within a store (e.g., a staffed checkout station or a "self-checkout" kiosk). The POS system 116 can be RFID based—i.e., the POS system 116 can use information it receives from an RFID tag associated with a product to facilitate purchase of the product. For example, the POS system 116 can broadcast RFID interrogation signals around or near a checkout station. When products to be purchased enter the zone defined by the range of the RFID interrogation signals, the products can provide response signals to the POS system 116. The response signals received by the POS system 116 can be used to identify the products and determine corresponding sale prices to enable purchase of the products. The POS system 116 can also be a more conventional barcode-based purchase system.

Regardless of the operation of the POS system 116, the POS system 116 can communicate with the system administration processor 106 during or immediately after the purchase of a specific product. Specifically, the POS system 116 can provide information to the system administration processor 106 that can be used to track the transaction status of products purchased using the POS system 116.

As further shown in FIG. 1, the theft prevention system 100 can include an alarm processing/signaling system 114. The alarm processing system 114 is shown connected to the system administration server 106. The communication medium and the communication protocol connecting the alarm processing system 114 to the system administration server 106 are immaterial to the present invention unless explicitly stated otherwise. The alarm processing system 114, or portions thereof, can be located on the same site as the store operating the theft prevention system 100 or can be remotely located.

The alarm signaling system 114 can receive notification from the system administration server 106 when it is determined that nefarious activity may be occurring in relation to a specific product. For example, if the system administration server 106 determines that a specific product is exiting the store but has not been validly purchased, then a signal indicating as much can be provided to the alarm signaling system 114. In response, the alarm signaling system 114 can provide any number of alarms to alert the proper personnel or systems of the violation event. Alarms or signals that can be issued by the alarm signaling system 114 include an audible alarm, a visual alarm, transmitting an alarm signal to a pager, phone or other mobile network device, transmitting a signal to a computer application, and transmitting a signal to the POS system 116 to prevent transactions involving certain products.

The theft prevention system 100 can be used in conjunction with product/packaging 118 that includes an RFID tag 120. The RFID tag 120 can be part of the product 118 or can be incorporated into the packaging of the product 118. The RFID tag 120 can receive and respond to interrogation signals from the tag readers 102-1 through 102-N. The RFID tag 120 can include information to specifically identify the product 118 to which the RFID tag 120 is associated. For example, the RFID tag 120 can include an EPC code. The product/packaging 118 can also include identifying information. For example, the product/packaging 118 can include one or more of a product barcode, the EPC code also maintained by the RFID tag 120, a UPC code, and a serial number of the EPC code. Further, the barcode of a product 118 can include coded information including expiration date or lot number. The RFID tag 120 and/or the product/packaging 118 can include information to identify the product 118 at a product type level (e.g., an SKU level) or at a specific product instance level (e.g., an exact identification of a particular product).

System Setup

Products to be sold (e.g., the product 118) can be associated with an RFID tag (e.g., the RFID tag 120). As previously described, the RFID tag 120 can be incorporated into the product or can be incorporated into the packaging of the product 118. In some embodiments, only high-valued items may be associated with an RFID tag 120 (e.g., high priced electronic products) as opposed to lower-valued items. The RFID tag 120 can electronically store an EPC electronically on an RFID chip of the RFID tag 120. Additionally, the product 118 can include a barcode that can store a UPC (Universal Product Code) and a serial number of the EPC. Other information can be stored in the barcode such as expiration date, lot number, or additional serial number information (for instance the serial number of the electronic hardware if it is different than the serial number of the EPC) as needed.

A database (e.g., the RFID tag administration database 108) can be updated to indicate a particular product 118 is "RFID secured." A product 118 is denoted or categorized as "RFID secured" when the product 118 is associated with a unique RFID tag 120. Products 118 can be categorized as RFID secured on a generic level (e.g., on a SKU level or product type level—using a product type code identifier) or on a specific product level (e.g., each individualized instance of a product is recorded if the specific product is RFID secured—using a unique product code identifier).

Purchase Transaction

When the product 118 is purchased by a consumer using the POS system 116, the POS system 116 can read the barcode of the product 118 to gather the UPC and the serial number of the SKU/product 118. The POS system 116 can then look up information about the product 118 to determine, for example, the selling price of the product 118. At the conclusion of the purchase transaction, information related to the transaction can be stored in the transaction status database 110. Specifically, the transaction status database 110 is modified to include a record related to the specific purchased product 118 that indicates that the product has been "validly purchased." For example, the transaction status database 110 can store the UPC and the serial information of the product 118 as well as an indication that the product 118 was properly sold or transferred to a customer. In order to comply with PII (Personal Identifying Information) laws, any specific transaction information (e.g., credit card numbers or other personal information) may be maintained in a separate database such that there is no correlation between the specific product 118 and potentially private transaction information.

Purchase Validation at Exit

The status of a product 118 associated with an RFID tag 120 and maintained as RFID secured can be verified when the product 118 is removed from a store. After the product 118 has been purchased at the POS system 116, a consumer typically moves the product 118 towards an access point (i.e., an exit) of a store. As the product 118 approaches the store exit, and as the product 118 is exiting the building, the product 118 may enter the broadcast zones of one or more of the RFID tag readers 102-1 through 102-N. Accordingly, during exit, the RFID tag 120 associated with the product 118 receives one or more interrogation signals. In response to one or more of the received interrogation signals, the RFID tag 120 transmits one or more interrogation response signals. The interrogation response signals are received by the tag readers 102-1 through 102-N and can be forwarded to the system administration server 106. The system administration server 106 can use the received response signals to determine the direction in which the RFID tag 120 (and therefore the product 118) is traveling.

As previously mentioned, the system administration server 106 can implement any number of signal processing algorithms to determine the travel direction of the RFID tag 120. Further, the system administration server 106 can also use information provided in signals received from one or more motion sensors located in the store (e.g., located near the access points of the store or building) to aid in the direction determination analysis.

When it is determined that the product 118 is exiting or leaving the store, the system administration server 106 can determine if the particular product 118 is set up as an "RFID secured" product 118. This can be determined on an SKU level (e.g., are products having this UPC RFID secured?) or on a specific product level (e.g., is this particular product RFID secured?). Determination of the security status of the product 118 can be completed by reviewing the records maintained in the tag administration database 108.

If it is determined that the product 118 is a secured product 118, then the system administration server 106 can examine the records maintained by the transaction status database 110 to determine the transaction status of the specific product 118. For example, the system administration server 106 can search the transaction status database 110 for the UPC and the serial number for the individual instance of the SKU to confirm that the product 118 has indeed been properly sold. The system administration server 106 can search the transaction status database 110 using any information or code that may identify the product 118 on a specific level (e.g., using a type of unique product code or combination of codes that identifies the product 118 uniquely).

When it is determined from a review of the transaction status database 110 that the exiting product 118 has been validly purchased (i.e., a record in the transactions status database 110 indicates the product 118 has been validly or properly purchased), then the system administration server 106 can determine that the removal or exit of the product 118 from the store is proper or acceptable. The system administration server 106 can store information related to the exit of the product 118. For example, the system administration server 106 can record when the product 118 was removed from the store and which access point was used for exit When it is determined from review of the transaction status database 110 that the exiting product 118 has not been validly purchased (i.e., a record in the transactions status database 110 indicates the product 118 has not been validly or properly purchased), then the system administration server 106 can determine that the present removal of the product 118 from the store is not proper or acceptable. Upon such a determination, the system administration server 106 can provide a signal to the alarm signaling system 114. The alarm signaling system 114 can subsequently provide one or more alarms to personnel or other theft prevention systems to indicate that a product 118 may be leaving a store improperly.

In an aspect of the present invention, the system administration server 106 can review the inventory tracking database 112 if it is determined that no record or information regarding a particular product 118 is maintained by either the RFID tag administration database 108 or the transaction status database 110. By reviewing the inventory tracking database 112, the system administration server 106 can determine if the particular product 118 was ever in the supply chain or inventory of the store/company. This enables the theft prevention system 100 to determine not to indicate an alarm if a product 118 exits a store that was never sold or was never in the possession of the store (e.g., if the product was sold by another retailer). Accordingly, products 118 that respond to interrogation signals can be filtered based on which products were in the supply chain of the store or were made to be RFID secured by an owner or operator of the store.

Return Validation

The theft prevention system 100 can also provide for validation of products 118 when an RFID secured product 118 enters a store. When the "RFID secured" product 118 is determined to be entering a store, the transaction status database 110 can be reviewed and updated with the UPC and serial information (or other unique product identification code) and an indication that the product is entering the store. For example, the indication can be a code and/or purchase/location status identifier such as "entering the building not purchased" or "entering the building, previously properly purchased."

By verifying and updating the status of RFID secured products 118 that enter the store (i.e., whether the product 118 re-enters or enter for the first time), potential problems related to the product 118 entering the building without being purchased upon exit can be mitigated. For example, the theft prevention system 100 can prevent an alarm from being issued when a previously validly purchased product is returned to a store by a customer (e.g., to return the item) and then exits without being purchased (e.g., the customer decides not to return the item). This detailed product validation mechanism allows RFID secured products from other vendors or stores to enter a store using the theft prevention system 100 without erroneously tripping alarms.

The theft prevention system 100 can also use information gathered from the RFID tag 120 during entry of the product 118 into a store to determine where else in the supply chain the particular product 118 has been. That is, the theft prevention system 100 can consult the inventory tracking database 112 (and the tag administration database 108 and the transaction status database 110 as necessary) to determine if a product 118 that enters the store was ever sold by the retailer, which store it was sold from or if a change in possession of the product 118 ever occurred. This enables the theft prevention system 100 to determine if the product 118 was ever in the possession of the retailer. Consequently, the theft prevention system 100 can prevent fraudulent returns and exchanges. For example, a product 118 that is determined to have been in the supply chain of the store/company that was never categorized as properly purchased can trigger an alarm when a return or exchange of the product 118 at the POS system 116 is attempted.

If it is determined that a particular product 118 was indeed validly purchased, then an attempt to return the product may be authorized by the theft prevention system 100. In doing so, the system administration server 106 can update the transaction status database 110 to indicate that the product 118 has been returned to the store and can be validly purchased again. Further, the system administration server 106 can update the inventory tracking database 112 to indicate the product has returned to the possession of the store/company.

Figure 2:
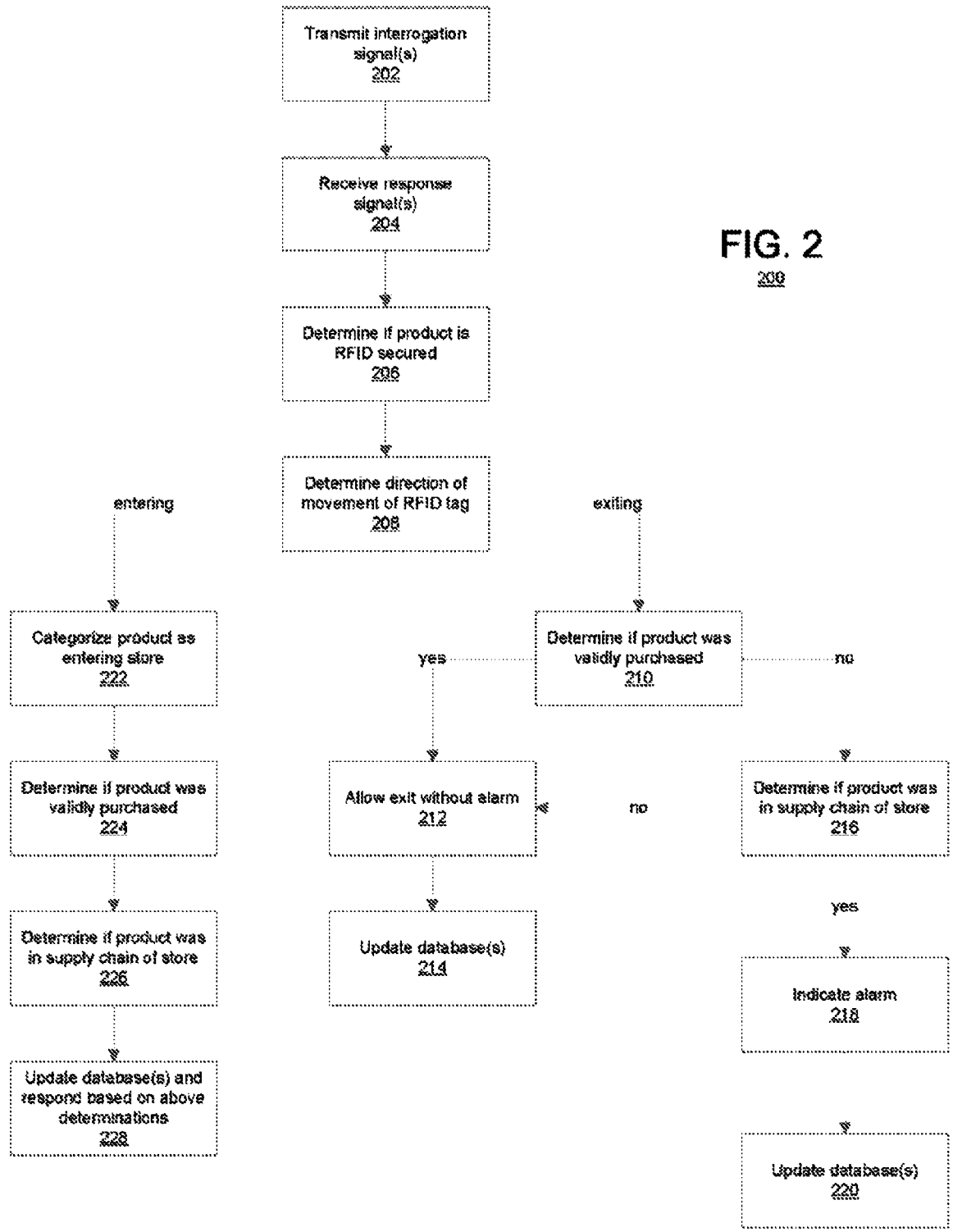
FIG. 2 provides a flowchart illustrating operation steps for preventing or deterring the theft or fraudulent return of a product having an RFID tag in accordance with an aspect of the present invention.

FIG. 2 provides a flowchart 200 illustrating operation steps for preventing or deterring the theft or fraudulent return of a product having an RFID tag in accordance with an aspect of the present invention. The method 200 can be implemented by one or more components of the theft prevention system 100 depicted in FIG. 1. The present invention is not limited to this operational description. Rather, it will be apparent to persons skilled in the relevant art(s) from the teachings herein that other operational control flows are within the scope and spirit of the present invention, including bypassing some steps, rearranging the order of some steps, and/or combining one or more steps into a single step. In the following discussion, the steps in FIG. 2 are described.

At step 202, one or more RFID interrogation signals are transmitted. The RFID interrogation signals can be transmitted by one or more tag readers or sensors in close proximity to an access point of a store. The interrogation signals can cover a portion of the entrance and exit areas of the store.

At step 204, one or more interrogation response signals are received. The response signals can be received by the tag readers that transmit the interrogation signals. The response signals can be transmitted by an RFID tag associated with a product. The RFID tag can be incorporated into the product, can be attached to the product, or can be contained in the packaging of the product.

At step 206, the response signals are used to determine whether the product associated with the RFID tag providing the response signals is RFID secured. Based on the response signals, a product type code can be determined. The product type code can indicate a manufacturer of the product and a model of the product. The product type code can be used to search a database storing information related to RFID secured products. Based on a review of the database using the product type code, it can be determined whether the product is RFID secured (i.e., has been enabled by the store owner or retailer to include an RFID tag to prevent theft and fraudulent returns).

At step 208, the response signals are used to determine a direction of travel or movement of the product associated with the RFID tag transmitting the response signals. Signal processing techniques using temporal diversity, spatial diversity and/or signal strength measurements can be used to process the response signals to determine the direction of movement of the product. One or more signals received from motion sensors can also be used to aid the determination of the direction of movement of the product. Based on the response signals, the product can be determined to be entering or exiting the access point of the store.

When a determination is made that the product is leaving or exiting the store through an access point, the method can proceed to step 210. At step 210, the transaction status of the product is determined. Specifically, it can be determined whether or not the product was validly purchased. A valid purchase of the product can occur prior to exit at the store or at a related or sister store (i.e., the product can be bought at a sister store and then brought into another store). To determine if the product was validly purchased, a unique product identification code can be determined. The unique product identification code can identify the product specifically and can distinguish it from all other products of the same make and model.

The unique product identification code can be used to search a database storing transaction information related to RFID products sold by the store and related stores. The database can provide an indication as to the transaction status of the product—i.e., whether the product was validly purchased or has not been validly purchased. The transaction status can also include an indication that the product has been validly returned or exchanged and can be purchased again.

When it is determined that the product was not validly purchased, the method can proceed to step 216. At step 216, a determination can be made regarding the supply chain history of the product. Specifically, a database tracking the inventory history of the product can be consulted to determine when, if ever, the product was in the supply chain of the store or a related store. The database can indicate when the product entered and exited the supply chain and can provide information regarding which store the product was purchased from and which stores the product has entered after purchase.

The method can proceed to step 218 when it is determined that the product was or currently is in the supply chain of a store or related store. At step 218, it has also been determined that the product has not been validly purchased and is attempting to exit the store. Accordingly, at step 218, an alarm can be provided to alert the proper personnel or theft prevention systems that an unauthorized exit of a product is occurring. If it is determined that the product was never in the supply chain of the store, then the method can proceed to step 212. At step 212, the product can be allowed to exit the store without an alarm being provided. A product that is not validly purchased may be allowed to leave a sore when it is determined that the store or any related store did not offer the product for sale. For example, the product may have been purchased at another retailer and then carried into the current store. Under such a scenario, it may not be proper to flag the exit of such a product as an event that should trigger an alarm indicating the desire to prevent the removal of the product from the store.

At step 220, one or more databases can be updated to reflect information regarding the status of the product. For example, information regarding the time of attempted exit, the location of the attempted exit and the result of the attempted exit can be stored.

When it is determined that the product was validly purchased at step 210, the method can proceed to step 212. At step 212, the product can be allowed to exit the store without incident (i.e., without an alarm being provided).

At step 214, one or more databases can be updated to reflect information regarding the status of the product. For example, information regarding the time of exit and the location of the exit can be stored.

When a determination is made at step 208 that the product is entering the store through an access point, the method can proceed to step 222. At step 222, the product can be categorized as having entered the store. One or more databases can be updated to specify the location status of the product (e.g., a record indicating the product is in the store), a time of entry and a location of entry.

At steps 224 and 226 more information regarding the product can be gathered or determined. For example, at step 224, a determination can be made as to whether the product was ever validly purchased. Further, at step 226, a determination can be made to determine if the product was ever in the supply chain of the store or a related store. Together, steps 224 and 226 can result in a determination of the sale history of the product—i.e., whether the product was ever offered for sale by the store or a related store and whether the product was purchased at the store or a related store.

At step 228, one or more databases can be updated based on the information gathering conducted in steps 224 and 226. Further, one or more actions can be taken as a result of the information gathering. For example, if it is determined that the product was in the supply chain of the store but the product was never sold, then an alarm may be provided to alert personnel or theft prevention systems of the possible nefarious activity. In such a situation, it may be possible to prevent a return or exchange of the product by preventing POS systems from conducting transactions involving the product. Similarly, if it is determined that the product was never in the supply chain of the store or a related store (e.g., the store was not offered for sale by the store but was instead sold by another retailer), then it may be desirable to prevent returns or exchanges of the product.

It is important to note that the present invention is not limited to the sequence of steps depicted in FIG. 2. That is, portions of the flowchart 200 can be combined such that one or more separate steps are combined into a single step. Further, portions of the flowchart 200 can be bypassed and/or the sequence of steps depicted in FIG. 2 can be modified or adjusted (i.e., the steps can occur in different sequential order) according to aspects of the present invention. For example, step 228 can occur at substantially the same time as step 222. Further, aspects of the present invention enable steps 224 and 226 to be bypassed such that the operations of these steps are not performed when a product enters a store (or at least are performed after step 228). As a further example, step 216 can occur at substantially the same as step 210 when it is determined a product is exiting a store and has not been validly purchased. In this way, the present invention allows each store to adjust when and how an alarm is triggered.

CONCLUSION

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. A method, comprising:
    transmitting an interrogation signal from a Radio-Frequency Identification (RFID) reader;
    receiving a response signal from an RFID tag;
    determining if a product associated with the RFID tag is RFID secured based on the response signal;
    determining a direction of movement of the RFID tag in relation to an access point of a store based on the response signal;
    when the RFID tag is determined to be exiting the access point of the store, determining if the product is authorized to exit the store by:
        consulting a product transaction database to determine whether the product has been validly purchased;
        if the product is validly purchased, identifying the product as authorized to exit the store;
        if the product is not validly purchased, consulting an inventory tracking database to determine whether the product has ever been in a supply chain of the store,
        if the product has not been in a supply chain of the store, identifying the product as authorized to exit the store,
        if the product has been in the supply chain of the store, identifying the product as not authorized to exit the store, and
    when the product is not authorized to exit the store, providing an alarm to indicate the product is not authorized to exit the store.

2. The method of claim 1, wherein determining if the product was validly purchased further comprises:
    determining a unique product identification code of the product;
    searching the product transaction database using the unique product identification code; and
    determining if the product transaction database includes a record indicating that the product corresponding to the unique product identification code was validly purchased.

3. The method of claim 1, wherein determining if the product associated with the RFID tag is RFID secured further comprises:
    determining a product type code for the product based on the response signal;
    searching a database using the product type code; and
    determining if the database includes a record indicating that the product corresponding to the product type code is RFID secured.

4. The method of claim 1, wherein determining the direction of movement of the RFID tag comprises determining the direction of movement based on signal processing techniques using temporal diversity.

5. The method of claim 1, wherein determining the direction of movement of the RFID tag comprises determining the direction of movement based on signal processing techniques using spatial diversity.

6. The method of claim 1, wherein determining the direction of movement of the RFID tag comprises determining a signal strength of the response signal.

7. The method of claim 1, wherein determining the direction of movement of the RFID tag comprises receiving a signal from a motion sensor.

8. The method of claim 1, wherein providing an alarm comprises providing a visual alarm.

9. The method of claim 1, wherein providing an alarm comprises providing an audible alarm.

10. The method of claim 1, wherein providing an alarm comprises providing a signal to a computer application.

11. The method of claim 1, wherein providing an alarm comprises providing a signal to a mobile device.

12. The method of claim 1, further comprising:
    when the RFID tag is determined to be entering the access point of the store, determining if the product is authorized for return;
    when the product is not authorized for return, preventing a point of sale system from conducting a transaction involving the product.

13. The method of claim 12, further comprising:
    determining a unique product identification code of the product;
    creating a record in a database comprising the unique product identification code and an indication that the product is entering the store.

14. The method of claim 13, wherein determining if the product is authorized for return comprises determining if the product was previously validly purchased.

15. The method of claim 14, wherein determining if the product is authorized for return comprises determining if the product was in a supply chain of the store.

16. The method of claim 1, wherein determination of whether the product has ever been in the supply chain of the store includes tracking inventory of one of other stores and distribution warehouses associated with the store.

17. A method, comprising:
combining a product with a Radio-Frequency Identification (RFID) tag;
storing a record indicating that the product is RFID secured in a first database;
conducting a transaction involving the product;
storing a record of the transaction in a second database;
determining when the product is exiting a store;
consulting the first database to determine if the product is indicated to be RFID secured;
consulting the second database to determine if the product was validly purchased;
consulting a third database to determine if the product has ever been in a supply chain of the store; and
providing an alarm signal when it is determined the product was not validly purchased and was in a supply chain of the store.

18. The method of claim 17, wherein determination of whether the product has ever been in the supply chain of the store includes tracking inventory of one of other stores and distribution warehouses associated with the store.

19. A theft prevention system, comprising:
a plurality of Radio-Frequency Identification (RFID) readers to transmit a plurality of RFID interrogation signals in an area covering a portion of an access point of a store and to receive one or more signals from an RFID tag associated with a product in response to the one or more transmitted RFID interrogation signals, the plurality of RFID readers being placed at both sides of the access point;
an RFID tag administration database to maintain records indicating which products offered for sale by the store are associated with RFID tags;
a product transaction status database to maintain a transaction history of products offered for sale by the store;
an inventory tracking database to maintain a supply chain history of products offered for sale by the store;
a system server to receive the one or more response signals from the one or more tag readers and to determine a direction of movement of the RFID tag in relation to the access point of the store; and
an alarm signaling system to provide an alarm when the system server determines the product is exiting the store and is not authorized to exit the store and when the product is being returned and the system server determines the product is not authorized for return,
wherein the system server determines the product is not authorized to exit the store when the RFID tag administration database indicates the product is RFID secured, the product transaction status database indicates the product was not validly purchased and the inventory tracking database indicates the product has been in a supply chain of the store.

20. The theft prevention system of claim 19, wherein the system server determines the product is not authorized for return when the RFID tag administration database indicates the product is RFID secured and one of the product transaction status database indicates the product was not validly purchased and the inventory tracking database indicates the product was not in a supply chain of the store.

21. The theft prevention system of claim 19, wherein the supply chain of the store includes inventory of one of other stores and distribution warehouses associated with the store.

* * * * *